Oct. 10, 1950 S. M. RODHE 2,524,992

FREQUENCY MODULATOR

Filed March 23, 1948 3 Sheets-Sheet 1

INVENTOR.
SVEN MAGNUS RODHE

BY Leech & Radue
ATTORNEYS

INVENTOR
SVEN MAGNUS RODHE
BY Leech & Radue
ATTORNEYS

FREQUENCY MODULATOR

Filed March 23, 1948 3 Sheets-Sheet 3

INVENTOR
SVEN MAGNUS RODHE
BY Leech & Radue
ATTORNEYS

Patented Oct. 10, 1950

2,524,992

UNITED STATES PATENT OFFICE 2,524,992

FREQUENCY MODULATOR

Sven Magnus Rodhe, Stockholm, Sweden, assignor to Telefonaktiebolaget L M Ericsson, Stockholm, Sweden, a company of Sweden Application March 23, 1948, Serial No. 16,530
In Sweden March 27, 1947

7 Claims. (Cl. 332—24)

This invention relates to a novel device for frequency modulation of carrier transmitters. The frequency deviation obtained in this modulator may be directly utilized for the final transmitter frequency without a following chain of frequency multiplicators as the case is for modulators with reactance tubes, now most frequently in use.

For this purpose it is also known to utilize rectifiers to obtain a variable coupling between an oscillating circuit, the frequency of which has to be varied in dependence of a signal intensity, and a second circuit having an influence on the oscillating frequency of the first-mentioned circuit. See for instance an article by Bramhall and Boughtwood, "Frequency - Modulated Carrier Telegraph System," in A. I. E. E. Transactions, pp. 36-39, January, 1942, especially Fig. 7.

This invention differs however from those previously known by one or more of the following features.

The modulator parts are galvanically entirely isolated from the vital parts of the oscillator.

The circuits having an influence on the frequency of the oscillating circuit are separated from the signal voltage source by aid of rectifiers arranged symmetrically in such a way that undue influence from said source on the circuits is prohibited. The different parts of these circuits are separated from each other in such a way that the trimming of the modulating properties of the circuits may easily be made without noticeable influence from one circuit on the other.

The modulator according to the invention contains an oscillator with an oscillating circuit to which two different circuits are coupled, in a preferred embodiment of the invention inductively, but otherwise in any manner known per se. These circuits contain each one resistance, variable in dependence of the signal voltage, with which the oscillator carrier frequency is to be modulated, in such a way that the resistance for one polarity of the signal voltage is practically non-conducting and for the opposite polarity of the signal voltage has a resistance value decreasing with increased signal voltage. One of the circuits is provided with circuit elements which cause an increase of the frequency of the oscillating circuit when the resistance value decreases and the other circuit with elements causing a decrease of the frequency in the same case. One may for instance contain an inductance in series with a coil coupled to the oscillating circuit and the other may contain a capacity in series with a corresponding coil. Also more complex impedances may be used for the purpose. The variable resistances of the different circuits are connected to the signal voltage source in such a way that they are conducting for opposite polarities of the signal voltage.

According to the invention the resistances variable in the manner described consist in rectifier arrangements connected as more closely described in connection with the figures.

Figure 1:
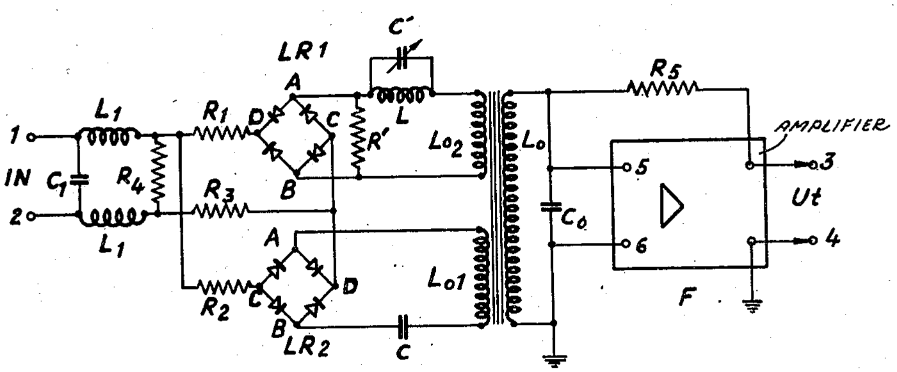
Fig. 1 shows a schematic diagram of a carrier transmitter according to the invention.

The carrier transmitter consists of the amplifier F, to the input terminals 5 and 6 of which an oscillating circuit is connected consisting of an inductance coil Lo and a condenser Co. Positive back feed is arranged from the terminal 3 of the output terminals 3 and 4 to the oscillating circuit to such a degree that the system will self-oscillate. In Fig. 1 this is illustrated by a resistance R5.

The coil Lo is provided with two different secondary windings Lo1 and Lo2. A condenser C is connected in series with the alternating current diagonal A—B of a rectifier bridge LR2 to the winding Lo1 and an indutance coil L is in the same manner connected in series with the alternating current diagonal A—B of a second rectifier bridge LR1 to the winding Lo2. The condenser C′ and the resistance R′ have no other function but for the trimming of the modulator.

The direct current diagonals C—D of the rectifiers LR1 and LR2 are mutually connected in parallel to a resistance R4 carrying the signal current with which the transmitter will be frequency modulated. Resistances R1 and R2 as well as a resistance R3 are connected in series with the rectifier bridge diagonals in order to minimize the influence of one circuit on the other. The inductance coils L1 and the condenser C1 constitute a low pass filter, to which the resistance R4 is the main terminating resistance. The signal voltage by which the transmitter has to be modulated is connected to the input terminals 1 and 2.

A signal voltage with such a polarity that the input terminal 1 is positive in relation to 2 results in a current through the rectifier bridge LR2 in the direction C to D and through the resistances R2 and R3. The rectifier bridge LR1, the direct current diagonal of which is connected in opposite polarity to the corresponding diagonal of the rectifier bridge LR2, receives back voltage without a current transit. For the opposite polarity of the signal voltage, i. e. terminal 2 positive in relation to terminal 1, the direct current diagonal C—D of the rectifier bridge LR1 carries current and the same diagonal of the rectifier bridge LR2 receives back voltage without current.

Figure 2:
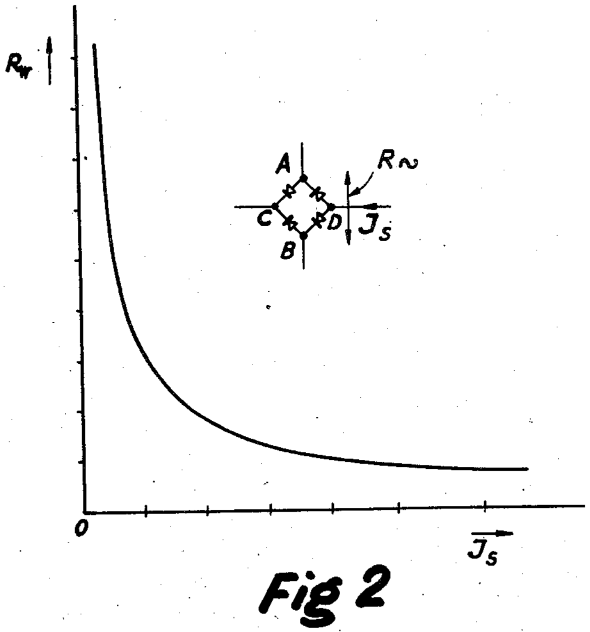
Fig. 2 shows a curve illustrating the resistance value of the resistances inserted in the circuits, having an influence on the carrier frequency, and according to Fig. 1 consisting in rectifier bridges.

The resistance $Rw$ (total resistive effect) in the alternating current diagonal A—B of a rectifier bridge is dependent on the current $Is$ through the direct current diagonal C—D as shown in Fig. 2. At zero-current the resistance $Rw$ is very great, but for an increased current it will sink rapidly for small values of $Is$ and thereafter slowly approach very low values for higher currents. For opposite voltage, i. e. when D is positive in relation to C, $Rw$ is very great. As the resistances of the rectifier parts A—C, C—B, B—D and D—A in the bridge have approximately the same value, the points C and D will have the same potential for an alternating current through the alternating current diagonal A—B. The alternating current circuit is thus entirely de-coupled from the control circuit of the transmitter.

For the signal voltage zero the resistances A—B of the two rectifier bridges thus are very great and the impedances of the inductance L and the capacitance C have consequently no influence on the oscillating circuit LoCo. The carrier frequency transmitter thus oscillates with the frequency $fo$, determined by Lo and Co, and from the output terminals 3 and 4 voltage is obtained with this frequency.

For a certain signal voltage, which gives a positive voltage to the input terminal 1, the resistance between the points A—B of the rectifier LR2 decreases as the voltage is increased. The capacitance C is therefore coupled tighter in parallel to the oscillating circuit LoCo via the winding Lo1 and the frequency of the transmitter will sink from the initial value $fo$, in dependence of the magnitude of the signal voltage, applied to the input terminals. The rectifier bridge LR1 has a high resistance between the points A—B and thus the inductance L has no influence on the frequency.

A negative signal voltage on the terminal 1, however, will cause a decrease of the resistance between the points A—B of the rectifier bridge LR1 while the resistance of the rectifier bridge LR2 is high. The inductance L is therefore connected in parallel to the oscillating circuit via the winding Lo2. The frequency will consequently rise with increased signal voltage of this polarity.

Figures 3, 4:
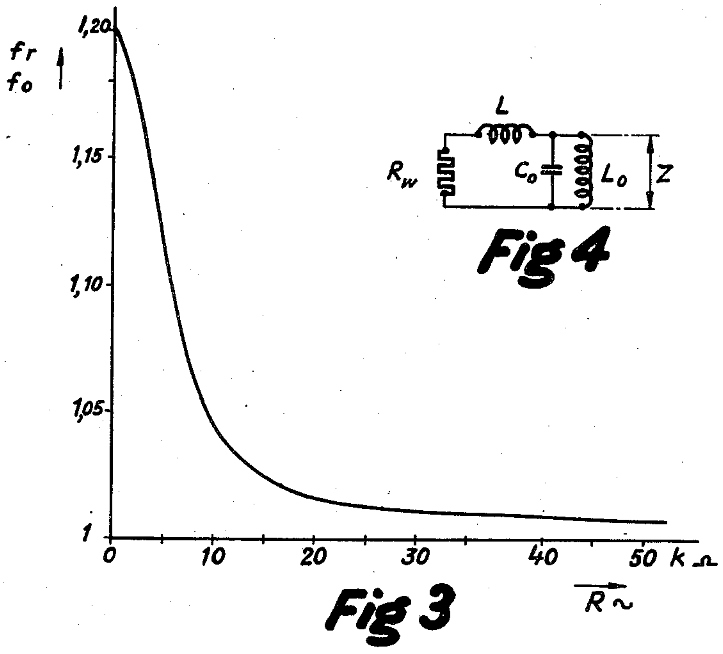
Fig. 3 illustrates the type of relation between the oscillator frequency and this resistance value.
Fig. 4 shows a simplified circuit illustrating the relation according to Fig. 3.

Examples of the frequency deviation is shown in Fig. 3, where an inductance L, according to Fig. 4 in series with a resistance $Rw$, is connected in parallel to an oscillating circuit Lo, Co. The resonance frequency $fr$ is obtained when the impedance Z of the circuit is real. In Figure 3 the relation $$\frac{fr}{fo}$$

where $fo$ is the resonance frequency for Lo and

Co alone, has been shown as a function of the resistance value $Rw$. For $Rw=\infty$ this relation is 1. For a decreased value of $Rw$ the frequency $fr$, for the value of L used in the example, will increase to 1.20 $fo$ for $Rw=0$. A corresponding curve is obtained for an oscillating circuit with a capacitance C connected in parallel to the circuit in series with a resistance $Rw$. In this case, however, the relation $fr/fo$ will be less than one.

Figure 5:
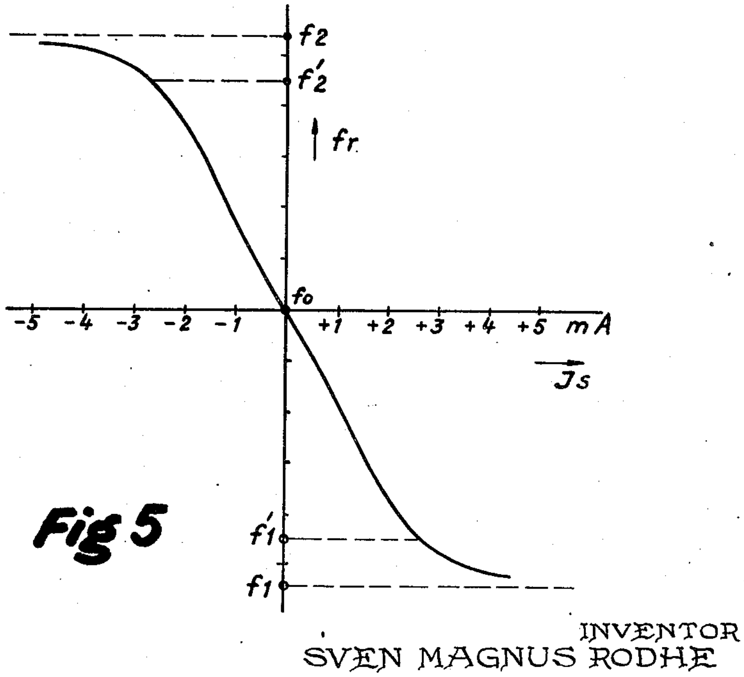
Fig. 5 illustrates the oscillator frequency as a function of the signal current for an embodiment of the invention.

In Fig. 5 the frequency of the transmitter is shown as a function of the control current $Is$ from the input terminal 1 to the input terminal 2. The lower frequency $f1$ is a frequency which would be obtained when $Rw=0$ in the rectifier bridge LR2 and $f2$ is the frequency to be obtained when $Rw=0$ in the rectifier bridge LR1.

The symmetry of the curve may be adjusted by aid of the resistances R1 and R2 of Fig. 1. The maximum deviation inside the range $f1$ to $f2$ is set by means of resistance R3. In the shown example the usable range of frequencies where the curve is straight extends between the frequencies $$f_1^1 \text{ and } f_2^1$$

The resistance R1 (Fig. 1) is used for straightening the curve in the neighbourhood of the average frequency $fo$, where the control current is low.

The condenser C1 is used for trimming of the inductance L.

The low pass filter L1C1 is used for limiting the signal frequency band.

An amplitude limiter may be connected after the output terminals 3 and 4 in order to eliminate undesirable amplitude modulation of the carrier or may be included in the amplifier F.

In Fig. 1 and in the preceding description a shunt connection of simple inductances L and capacitances C with the oscillating circuit has been shown. In certain cases it may be suitable to use more complicated impedances.

Figure 6:
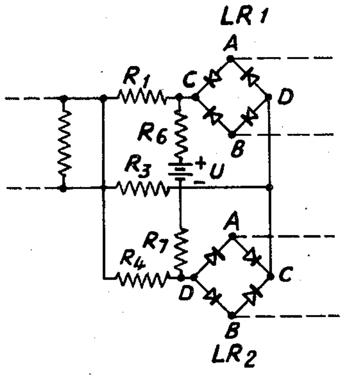
Fig. 6 is a diagram illustrating a detail of the modulator, somewhat differing from corresponding part of Fig. 1, showing how a certain threshold value for the signal voltage before a modulation is obtained is introduced into the circuit and Fig. 7 the relation between the oscillator frequency and the signal current in a device according to Fig. 6.
Figure 7:
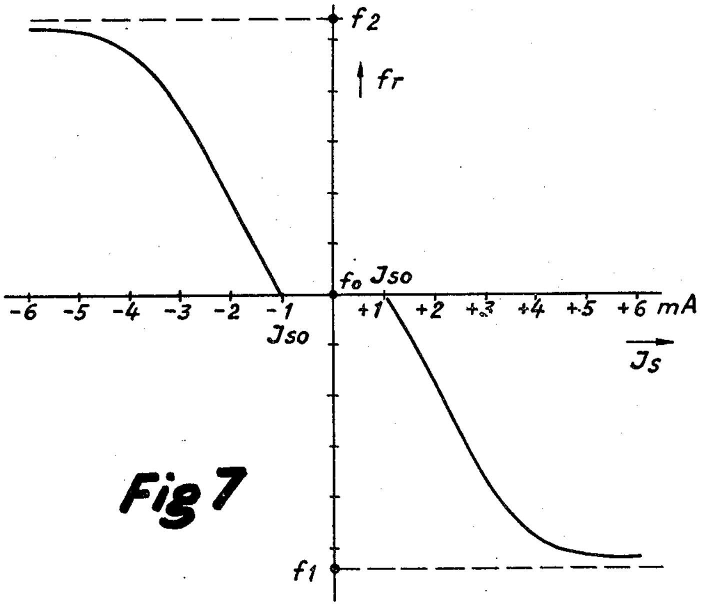

If the signal line connected to the input side of the frequency modulator carries background interference it may be suitable to connect a bias voltage U to the rectifiers, according to Fig. 6 in series with resistances R6 and R7 between point C on the rectifier bridge LR1 and point D on the rectifier bridge LR2. The polarity of the bias voltage is such that the two rectifiers receive back voltage. Hence a certain current $Iso$ is necessary before a frequency deviation takes place. A modulation curve with such bias connected to the rectifiers is shown in Fig. 7.

I claim:

1. A frequency modulation system for a source of carrier voltage comprising in combination with a frequency determining circuit of said carrier voltage of an inductance, a capacitance, a pair of four element rectifier bridges, a circuit connecting one diagonal of one of said bridges to said inductance, a circuit connecting one diagonal of the other bridge to said capacitance, separate means coupling each of the last mentioned circuits to said first mentioned circuit, each of said diagonals being opposite to one in which the bridge elements are all conducting from one end to the other thereof, input terminals for said modulator and means connecting the remaining diagonals of said bridges in parallel to said terminals in such a manner that one diagonal only is conducting for each polarity of a signal applied to said terminals.

2. A frequency modulation system for a source of carrier voltage comprising in combination with a frequency determining inductance of said carrier voltage, of a pair of coils inductively coupled to said inductance, a pair of four element rectifier bridges each having the elements arranged to be all conducting from opposite ends of a first diagonal, an inductive reactance, means connecting said reactance, one of said coils and the second diagonal of one of said bridges in series, a capacitive reactance, means connecting said second reactance, the other coil and the second diagonal of the remaining bridge in series, means connecting the first diagonals of said bridges in parallel but oppositely directed as to conductivity and means to apply a modulating signal of reversing polarity to said last mentioned means.

3. The system as claimed in claim 2 in which means is provided to regulate the effect of one of said reactances on said inductance.

4. The system of claim 2 in which said inductive reactance is shunted by a variable condenser and its bridge diagonal is shunted by an adjustable resistance.

5. The system of claim 1 in which a separate adjustable resistance is connected between one end of each of the remaining diagonals and one of the said input terminals, and an adjustable resistance is connected between the other terminal and the junction of the opposite ends of said diagonals.

6. The system of claim 2 in which a source of direct current potential is connected to the said bridges to provide back voltage to both of the second diagonals.

7. The system of claim 2 in which said last mentioned means includes a low pass filter and a terminating resistance across which the modulating signal is impressed.

SVEN MAGNUS RODHE.

REFERENCES CITED

The following references are of record in the file of this patent:

UNITED STATES PATENTS

| Number | Name | Date |
|---|---|---|
| 2,045,107 | Shore | June 23, 1936 |
| 2,374,000 | Crosby | Apr. 17, 1945 |
| 2,397,992 | Stodola | Apr. 9, 1946 |